US008307305B2

(12) United States Patent
Duhig

(10) Patent No.: US 8,307,305 B2
(45) Date of Patent: Nov. 6, 2012

(54) SCROLLING INTERFACE

(75) Inventor: Jonathan Anthony Duhig, Scotland Island (AU)

(73) Assignee: Canon Kabushiki Kaisha, Tokyo (JP)

( * ) Notice: Subject to any disclaimer, the term of this patent is extended or adjusted under 35 U.S.C. 154(b) by 827 days.

(21) Appl. No.: 11/952,651

(22) Filed: Dec. 7, 2007

(65) Prior Publication Data

US 2008/0155474 A1 Jun. 26, 2008

(30) Foreign Application Priority Data

Dec. 21, 2006 (AU) ................................ 2006252196

(51) Int. Cl.
*G06F 3/048* (2006.01)
(52) U.S. Cl. ........ 715/830; 715/716; 715/810; 715/719; 715/786
(58) Field of Classification Search .................. 715/830, 715/833, 854, 851, 855, 825; 345/123, 684; 725/109, 110, 135
See application file for complete search history.

(56) References Cited

U.S. PATENT DOCUMENTS

| 5,202,961 | A | * | 4/1993 | Mills et al. ..................... 715/720 |
| 5,434,591 | A |   | 7/1995 | Goto et al. ..................... 345/123 |
| 5,452,413 | A |   | 9/1995 | Blades ............................ 395/159 |
| 5,495,566 | A | * | 2/1996 | Kwatinetz ..................... 715/785 |
| 5,530,455 | A |   | 6/1996 | Gillick et al. ................... 345/163 |
| 5,623,588 | A | * | 4/1997 | Gould ............................. 715/787 |
| 5,760,767 | A | * | 6/1998 | Shore et al. ..................... 715/723 |
| 5,774,109 | A |   | 6/1998 | Winksy et al. .................. 345/124 |
| 5,801,702 | A | * | 9/1998 | Dolan et al. .................... 715/854 |
| 5,936,618 | A |   | 8/1999 | Spiero et al. .................... 345/204 |
| 5,943,679 | A |   | 8/1999 | Niles et al. ...................... 707/526 |
| 6,097,371 | A |   | 8/2000 | Siddiqui et al. ................. 345/164 |
| 6,121,966 | A | * | 9/2000 | Teodosio et al. ............... 715/838 |
| 6,154,205 | A |   | 11/2000 | Carroll et al. .................. 345/327 |
| 6,252,597 | B1 |   | 6/2001 | Lokuge .......................... 345/353 |
| 6,262,724 | B1 |   | 7/2001 | Crow et al. ..................... 345/328 |
| 6,613,100 | B2 |   | 9/2003 | Miller ............................ 715/526 |
| 6,738,045 | B2 |   | 5/2004 | Hinckley et al. ............... 345/163 |
| 6,747,680 | B1 |   | 6/2004 | Igarashi et al. ................. 345/784 |
| 6,971,121 | B2 | * | 11/2005 | West et al. ...................... 725/142 |
| 6,976,229 | B1 | * | 12/2005 | Balabanovic et al. ......... 715/838 |
| 7,051,291 | B2 |   | 5/2006 | Sciammarella et al. ....... 715/838 |
| 7,107,532 | B1 |   | 9/2006 | Billmaier et al. .............. 715/720 |
| 7,152,209 | B2 | * | 12/2006 | Jojic et al. ...................... 715/720 |
| 7,548,936 | B2 |   | 6/2009 | Liu et al. ..................... 707/104.1 |

(Continued)

FOREIGN PATENT DOCUMENTS

EP 0 813 138 A1 6/1997

(Continued)

*Primary Examiner* — Tuyetlien Tran
*Assistant Examiner* — Abimbola Ayeni
(74) *Attorney, Agent, or Firm* — Fitzpatrick, Cella, Harper & Scinto

(57) ABSTRACT

Disclosed is a method (600) of scrolling a list (510) including video items (504-508) on a display device (501). The list is scrolled to modify a displayed subset of the items. The scrolling of the list is terminated and at least one of the displayed video items (507) is played after the termination, and the playback of the at least one displayed video item is then adapted after a predetermined period of time. The terminating of the scrolling may be in response to a user input. The displayed video items generally comprise one selected focus item the playback of which is adapted differently from the remaining displayed video items. The adapting is preferably to stop the playback of the video items.

7 Claims, 9 Drawing Sheets

U.S. PATENT DOCUMENTS

| | | |
|---|---|---|
| 7,681,141 B2 * | 3/2010 | Tu .................................. 715/784 |
| 7,698,654 B2 * | 4/2010 | Fong et al. .................... 715/810 |
| 7,707,137 B2 | 4/2010 | Nazarian et al. .................. 707/1 |
| 7,735,104 B2 * | 6/2010 | Dow et al. ........................ 725/52 |
| 7,797,641 B2 | 9/2010 | Karukka et al. .............. 715/802 |
| 7,810,046 B2 | 10/2010 | Hiraoka et al. ............... 715/810 |
| 7,814,436 B2 * | 10/2010 | Schrag et al. ................. 715/851 |
| 8,112,711 B2 * | 2/2012 | Ackley .......................... 715/716 |
| 2001/0012023 A1 | 8/2001 | Kobayashi et al. ........... 345/835 |
| 2002/0054059 A1 | 5/2002 | Schneiderman .............. 345/700 |
| 2002/0118169 A1 | 8/2002 | Hinckley et al. .............. 345/163 |
| 2003/0033296 A1 | 2/2003 | Rothmuller et al. .............. 707/3 |
| 2003/0218637 A1 | 11/2003 | Sloo et al. ..................... 345/810 |
| 2004/0021694 A1 | 2/2004 | Doar .............................. 345/784 |
| 2004/0153446 A1 | 8/2004 | Castronova ....................... 707/3 |
| 2004/0160458 A1 | 8/2004 | Igarashi et al. ............... 345/660 |
| 2005/0010953 A1 * | 1/2005 | Carney et al. ................... 725/61 |
| 2005/0091597 A1 * | 4/2005 | Ackley .......................... 715/716 |
| 2005/0187976 A1 | 8/2005 | Goodman et al. ......... 707/104.1 |
| 2005/0206658 A1 | 9/2005 | Fagans .......................... 345/660 |
| 2005/0251748 A1 | 11/2005 | Gusmorino et al. .......... 715/713 |
| 2005/0251760 A1 | 11/2005 | Sato et al. ..................... 715/856 |
| 2005/0257166 A1 * | 11/2005 | Tu .................................. 715/787 |
| 2006/0117356 A1 * | 6/2006 | Jojic et al. ........................ 725/88 |
| 2006/0236362 A1 * | 10/2006 | Istvan et al. .................... 725/135 |
| 2006/0271870 A1 | 11/2006 | Anwar ........................... 715/764 |
| 2007/0136286 A1 | 6/2007 | Webster et al. .................... 707/7 |
| 2007/0198476 A1 | 8/2007 | Farago et al. ...................... 707/3 |
| 2007/0226646 A1 | 9/2007 | Nagiyama et al. ............ 715/784 |
| 2008/0148152 A1 * | 6/2008 | Blinnikka et al. ............ 715/719 |
| 2008/0150892 A1 | 6/2008 | Duhig et al. .................. 345/156 |
| 2008/0155473 A1 | 6/2008 | Duhig ........................... 715/818 |
| 2008/0155474 A1 * | 6/2008 | Duhig ........................... 715/830 |
| 2008/0155475 A1 | 6/2008 | Duhig ........................... 715/830 |
| 2008/0158261 A1 * | 7/2008 | Gould ........................... 345/666 |
| 2008/0313214 A1 | 12/2008 | Duhig et al. .................. 707/102 |
| 2009/0013280 A1 * | 1/2009 | Ballard .......................... 715/783 |
| 2009/0070710 A1 | 3/2009 | Kagaya et al. ................ 715/764 |
| 2009/0100373 A1 * | 4/2009 | Pixley et al. .................. 715/786 |

FOREIGN PATENT DOCUMENTS

| | | |
|---|---|---|
| EP | 1239672 | 9/2002 |
| EP | 1 667 013 A2 | 11/2005 |
| WO | WO 01/29702 A2 | 4/2001 |
| WO | WO 02/17060 | 2/2002 |

\* cited by examiner

SCROLLING INTERFACE

CROSS-REFERENCE TO RELATED PATENT APPLICATIONS

This application claims the right of priority under 35 U.S.C. § 119 based on Australian Patent Application No. 2006252196, filed Dec. 21, 2006, which is incorporated by reference herein in its entirety as if fully set forth herein.

FIELD OF INVENTION

The present invention relates to the presentation of audio-visual items and, in particular, to a method of scrolling such audiovisual items in an efficient and effective manner.

BACKGROUND

With the advent and huge popularity of digital video cameras and internet multimedia it is common for people to store a large number of audio-visual materials on personal computers and other computer related devices. There is a need for users of these devices to be able to access and navigate through their documents to view items and to visually search for items.

Modern computing systems often provide a variety of methods for viewing large collections of documents which can be controlled by computer interface control devices including a mouse and pointer, and also by keyboard input, or other physical controls such as scroll wheels, as found on some mouse devices. The methods generally provide a means to select a location within a storage structure and return the set of items within that location or to return a set of items matching a certain query. A viewing area is then used to display representations of items from the set, typically in a sequence. For large sets it is common that only a limited number of the items in the set can be viewed in the viewing area at any one time. The user can use the mouse and pointer or other input control devices to execute commands which move items through the viewing area so that items earlier or later in the sequence are displayed. The action of visually moving items past a display area is herein referred to as "scrolling". The action of controlling scrolling for the purpose of exploring a set is herein referred to as "browsing". These terms are widely known in the art according to these general definitions.

Audiovisual items represent a class of digital content which include audio content, visual content or a combination of both. The visual content may be static (single) image or a sequence of image frames that are typically but not always accompanied by some audio content. This latter type of content is generally referred to as video content and can include a sequence of images of real-life scene(s), animation, or a combination of the two. The scene need not be contiguous and may be formed into a single reproducible sequence through the editing or splicing together of a number of discrete sequences or "clips", as they are known in the art. The video content may be stored or recorded in a number of formats each able to be reproduced with an appropriate decoder.

Some browsing systems display such audiovisual items as static images, each representing the first or a later frame in the corresponding visual sequence. This has the disadvantage that it is not always possible to reliably identify items based on the displayed first single frame. Furthermore, where the content type in any one collection is mixed, it may not be possible to distinguish audiovisual items which have a moving video sequence from those items which are a single frame such as a photograph. Some systems automatically play back all the frames in the sequence in real time or transition between different frames in the sequence. This has the disadvantage that when many items are shown, the viewer is often drawn to look at items which change appearance when they wish to remain focused on a sequence from a single item.

SUMMARY

In accordance with one aspect of the present invention there is disclosed a method of scrolling a list including video items on a display device. The method comprises the steps of: scrolling the list to modify a displayed subset of said items; and terminating the scrolling of the list and playing at least one of the displayed video items after the termination, and adapting the playback of the at least one displayed video item after a predetermined period of time.

Generally, the terminating of the scrolling is in response to a user input. Typically, the displayed video items comprise one selected focus item the playback of which is adapted differently from the remaining displayed video items. The predetermined period of time may be determined by the position of the video items in the list relative to a reference item of the items. Alternatively the predetermined period of time may be determined by a display position of said video items. The adapting may be to stop the playback of the video items. Alternatively the adapting may be to adapt the playback speed of the items. The adapting may alternatively or additionally operate to show a reduced subset of frames from the video items. Also, the playing of the at least one video item may be commenced (i) during the scrolling or (ii) upon terminating the scrolling.

Other aspects are also disclosed.

BRIEF DESCRIPTION OF THE DRAWINGS

At least one embodiment of the present invention will now be described with reference to the drawings in which.

DETAILED DESCRIPTION INCLUDING BEST MODE

Disclosed is a method for browsing a collection of items stored in a digital system. The items may include images (such as bitmap or graphic), sounds (such as speech, music or songs), video (such as movies or animations), documents or data records, to name but a few. The actual storage of such collections of items in digital systems is well known. Items are typically stored in a hierarchical file system or a database structure on a storage medium such as a hard disk, optical disk or random access memory (RAM).

The methods of browsing a collection of data files or items to be described may be practiced using a general-purpose computer system 400, such as that shown in FIG. 4 wherein the processes to be described with reference to the remaining figures may be implemented as software, such as an application program executing within the computer system 400. In particular, the steps of the browsing methods are effected by instructions in the software that are carried out by the computer. The instructions may be formed as one or more code modules, each for performing one or more particular tasks. The software may also be divided into two separate parts, in which a first part performs the actual browsing and searching methods, and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for browsing a collection of data items.

Figure 4:
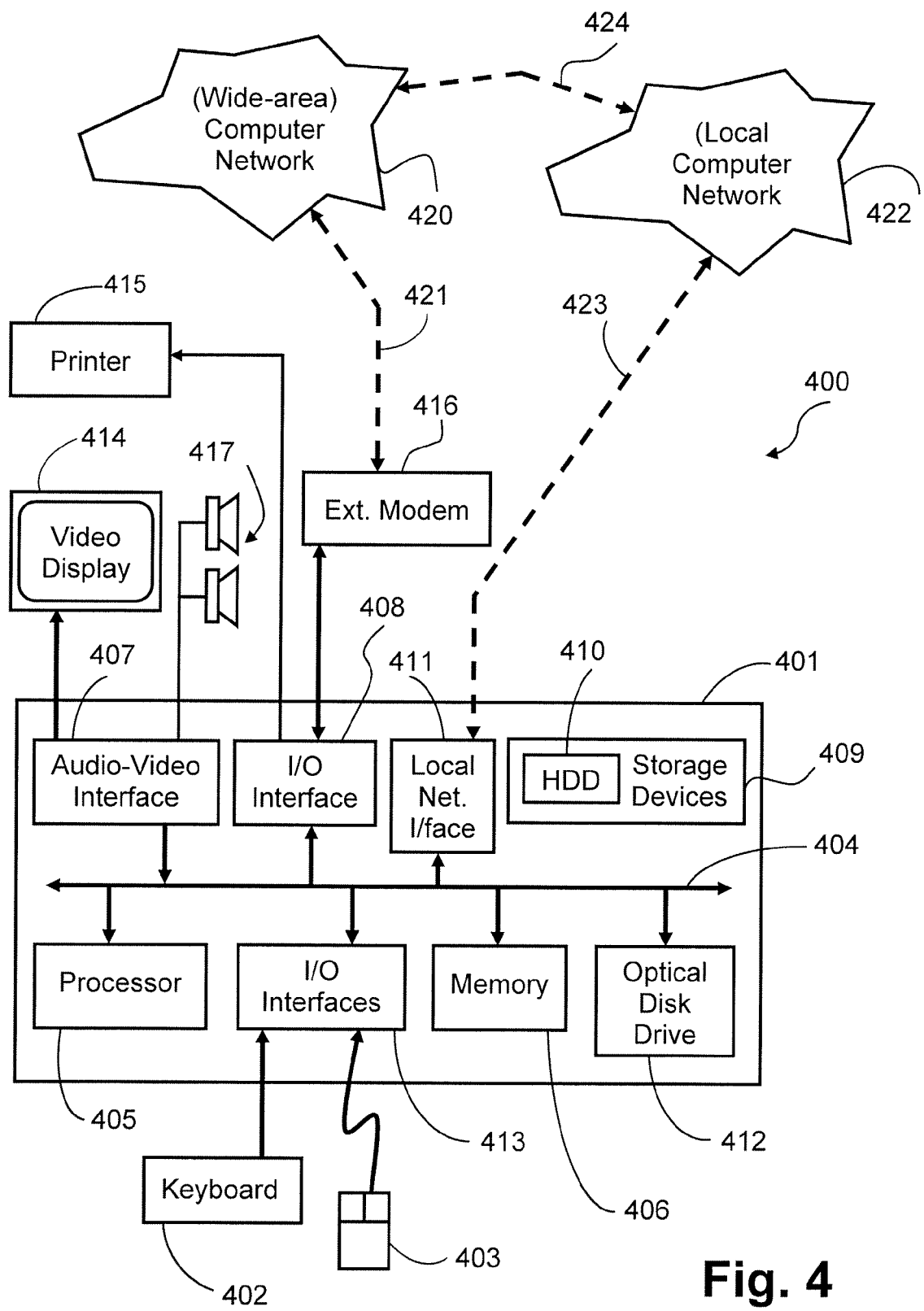
FIG. 4 is a schematic block diagram representing a general purpose computer upon which the described arrangements may be implemented.

As seen in FIG. 4, the computer system 400 is formed by a computer module 401, input devices such as a keyboard 402 and a mouse pointer device 403, and output devices including a printer 415, a display device 414 and loudspeakers 417. An external Modulator-Demodulator (Modem) transceiver device 416 may be used by the computer module 401 for communicating to and from a communications network 420 via a connection 421. The network 420 may be a wide-area network (WAN), such as the Internet or a private WAN. Where the connection 421 is a telephone line, the modem 416 may be a traditional "dial-up" modem. Alternatively, where the connection 421 is a high capacity (eg: cable) connection, the modem 416 may be a broadband modem. A wireless modem may also be used for wireless connection to the network 420.

The computer module 401 typically includes at least one processor unit 405, and a memory unit 406 for example formed from semiconductor random access memory (RAM) and read only memory (ROM). The module 401 also includes an number of input/output (I/O) interfaces including an audio-video interface 407 that couples to the video display 414 and loudspeakers 417, an I/O interface 413 for the keyboard 402 and mouse 403 and optionally a joystick (not illustrated), and an interface 408 for the external modem 416 and printer 415. In some implementations, the modem 416 may be incorporated within the computer module 401, for example within the interface 408. The computer module 401 also has a local network interface 411 which, via a connection 423, permits coupling of the computer system 400 to a local computer network 422, known as a Local Area Network (LAN). As also illustrated, the local network 422 may also couple to the wide network 420 via a connection 424, which would typically include a so-called "firewall" device or similar functionality. The interface 411 may be formed by an Ethernet circuit card, a wireless Bluetooth™ or an IEEE 802.11 wireless arrangement.

The interfaces 408 and 413 may afford both serial and parallel connectivity, the former typically being implemented according to the Universal Serial Bus (USB) standards and having corresponding USB connectors (not illustrated). Storage devices 409 are provided and typically include a hard disk drive (HDD) 410. Other devices such as a floppy disk drive and a magnetic tape drive (not illustrated) may also be used. An optical disk drive 412 is typically provided to act as a non-volatile source of data. Portable memory devices, such optical disks (eg: CD-ROM, DVD), USB-RAM, and floppy disks for example may then be used as appropriate sources of data to the system 400.

The components 405, to 413 of the computer module 401 typically communicate via an interconnected bus 404 and in a manner which results in a conventional mode of operation of the computer system 400 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 410 and read and controlled in execution by the processor 405. Intermediate storage of such programs and any data fetched from the networks 420 and 422 may be accomplished using the semiconductor memory 406, possibly in concert with the hard disk drive 410. In some instances, the application programs may be supplied to 10 the user encoded on one or more CD-ROM and read via the corresponding drive 412, or alternatively may be read by the user from the networks 420 or 422. Still further, the software can also be loaded into the computer system 400 from other computer readable media. "Computer readable storage media" herein refers to any storage medium that participates in providing instructions and/or data to the computer system 400 for 15 J execution and/or processing. Examples of other such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 401. Examples of computer readable transmission media that may also participate in the 20 provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 414. Through manipulation of the keyboard 402 and the mouse 403, a user of the computer system 400 and the application may manipulate the interface to provide controlling commands and/or input to the applications associated with the GUI(s).

Whilst the computer system 400 may be used to implement the browsing arrangements to be described, such may also be configured in more specific user devices of smaller size or limited application. Such specific user devices include, but are not limited to, portable/personal audio and/or video reproduction devices, for example utilizing MP3 or MPEG file formats.

Figure 1:
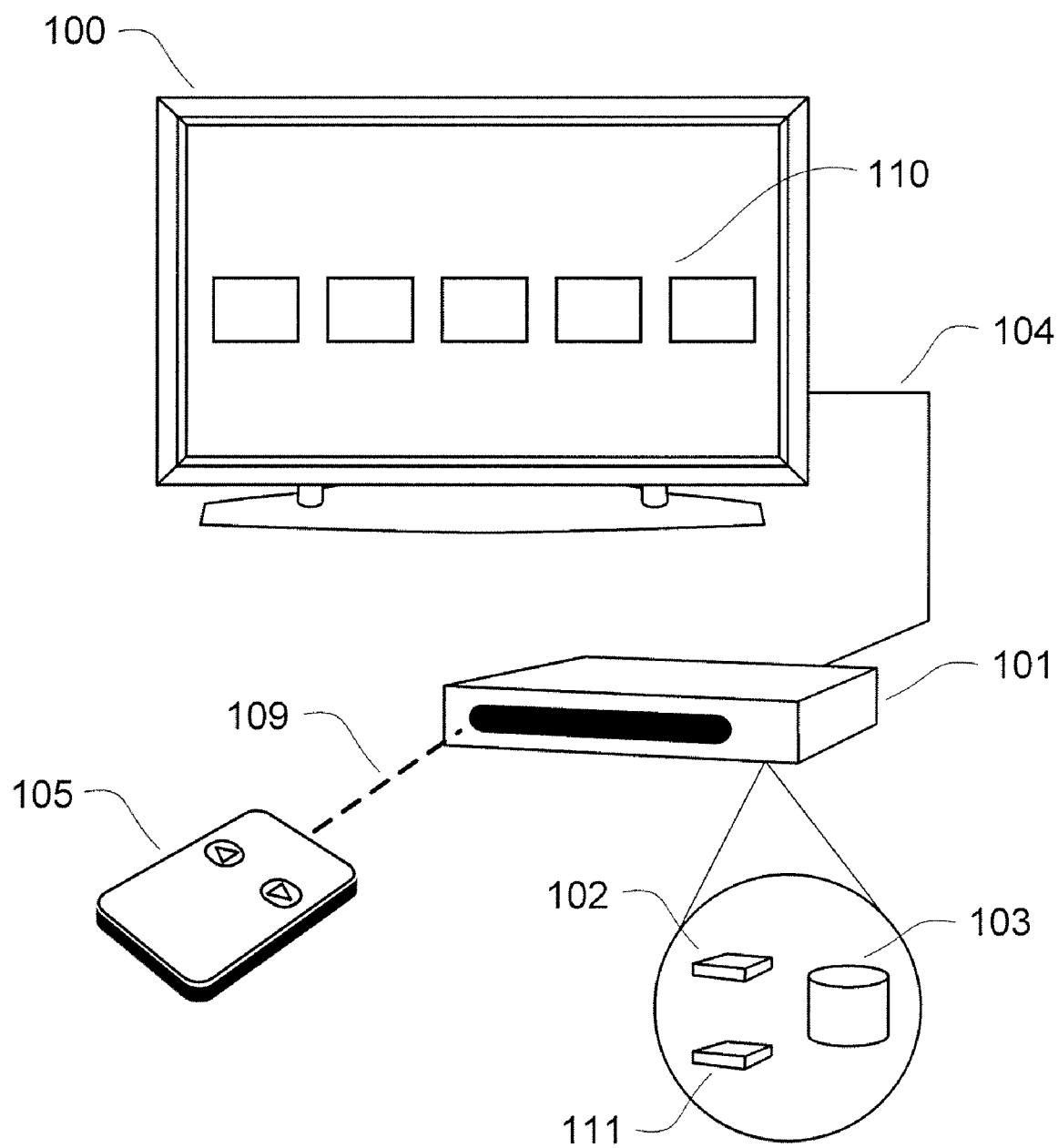
FIG. 1 is a system diagram showing a typical digital system for the reproduction of data items.

FIG. 1 shows a digital system having a display 100 connected to a media device 101 by a connector 104. This connector may use wires or be wireless using radio or infrared signal. The media device 101 comprises at least a Central Processing Unit (CPU) 102 and a data storage system 103, typically configured in a manner akin to corresponding components of the computer 401 of FIG. 4 described above. The media device 101 may be a dedicated reproduction device, a device with additional capabilities such as a TV tuner, a set-top box, or a DVD player, or may be a general purpose Personal Computer (PC). The media device 101 may additionally contain a Graphics Processing Unit (GPU) 111 which assists in the rendering of a graphical user interface 110 to the display 100. The GPU 111 may support the execution of graphics libraries such as OpenGL, a registered trade mark of certain products manufactured by Silicon Graphics, Inc. of U.S.A. The data storage system 103 typically contains a plurality of items represented in digital form. Alternatively, in network configured arrangements, such as a CATV set-top box arrangement, the device 101 may provide access via the network to the stored items.

An application program operating in accordance with the present disclosure and executed by the CPU 102, optionally assisted by the GPU 111, causes the user interface 110 to be rendered upon the display 100.

A control device 105, illustrated as a hand-portable remote control, is operable by a user to transmit a signal 109 to the media device 101, wherein the signal is received by the CPU 102 and causes control events to occur which may result in changes to the state of the digital system and to the user interface 110 represented upon the display 100. The signal 109 may be an infra-red signal or a radio signal or alternatively the control device 105 may also be connected by one or more wires or may be integrated into the media device 101. The control device 105 may alternatively be a standard input device such as a keyboard or mouse, akin to those described above.

In some implementations, the Central Processing Unit (CPU) 102, the optional Graphics Processing Unit (GPU) 111 and the data storage system 103 may be contained directly within the chassis of the display 100, thereby eliminating the need for the media device 101 and the connector 104. In other implementation, the display 100 may be portable. Further, the functional components of the device 101 may be included in a device with additional capabilities, for example a digital camera, with the user interface 110 being rendered either on a display which is integrated into the device or on an external display. Some components and user controls may be shared between the browsing application and any additional capabilities of the device.

Some items stored in the computers 101, 401 are static such as photographs. Other content can change over time such as video recordings and animations. Content that is not static and changes over time is herein referred to as video.

Figure 3A:
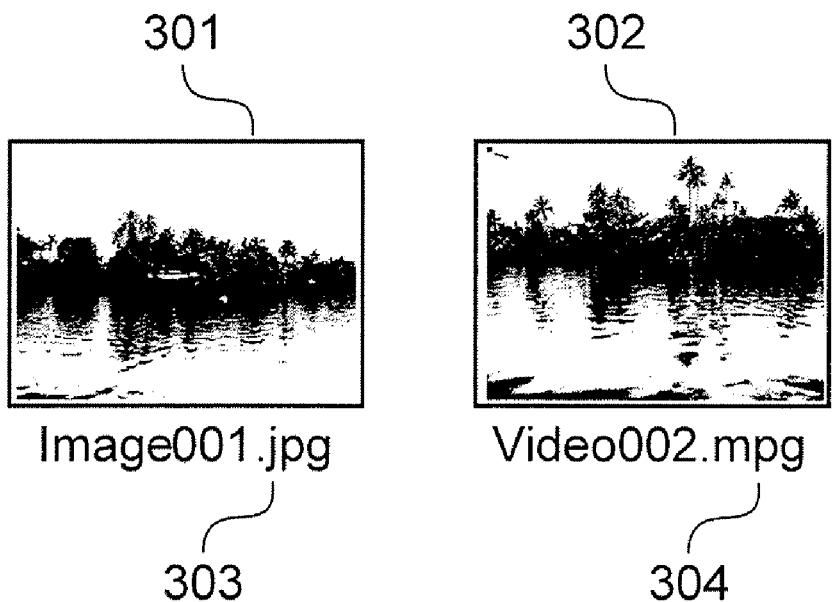
FIGS. 3A and 3B show examples of prior art methods to disambiguate multimedia items of different types.
Figure 3B:
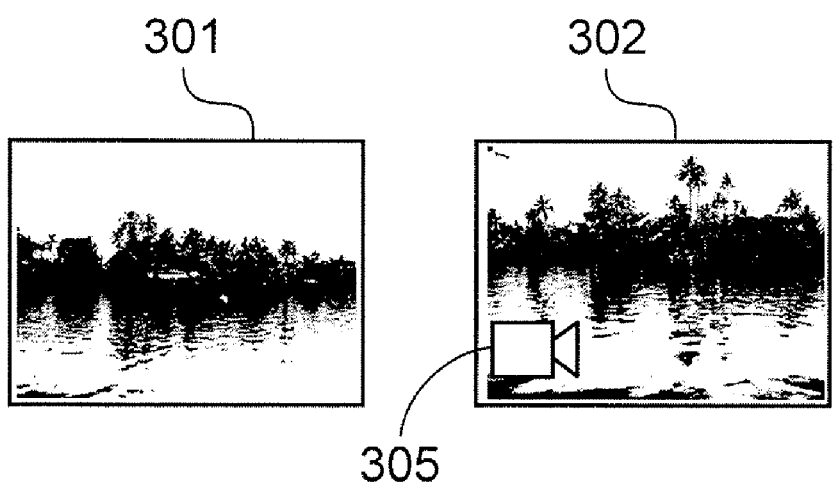

Some previous technologies have sought to alert the user to video items using the name of the video item to distinguish video items from static items such as photographs. FIG. 3A shows two items, a photograph 301 and a video 302 displayed as small preview images according to known browser applications. Each item has a filename label. The photograph 301 has a filename label 303 which has a type '.jpg', whereas the video item 302 has a filename label which has a type '.mpg'. The display system may alternately indicate file types in other ways familiar to those with computer experience. Another way that display systems can disambiguate video items from static items is to overlay a graphic icon upon video items. FIG. 3B shows another prior art approach having a static photograph 301, and a video item 302 provided with an icon 305 overlaid on the video item 302 to disambiguate the content type from other content types, such as the item 301.

Figure 2:
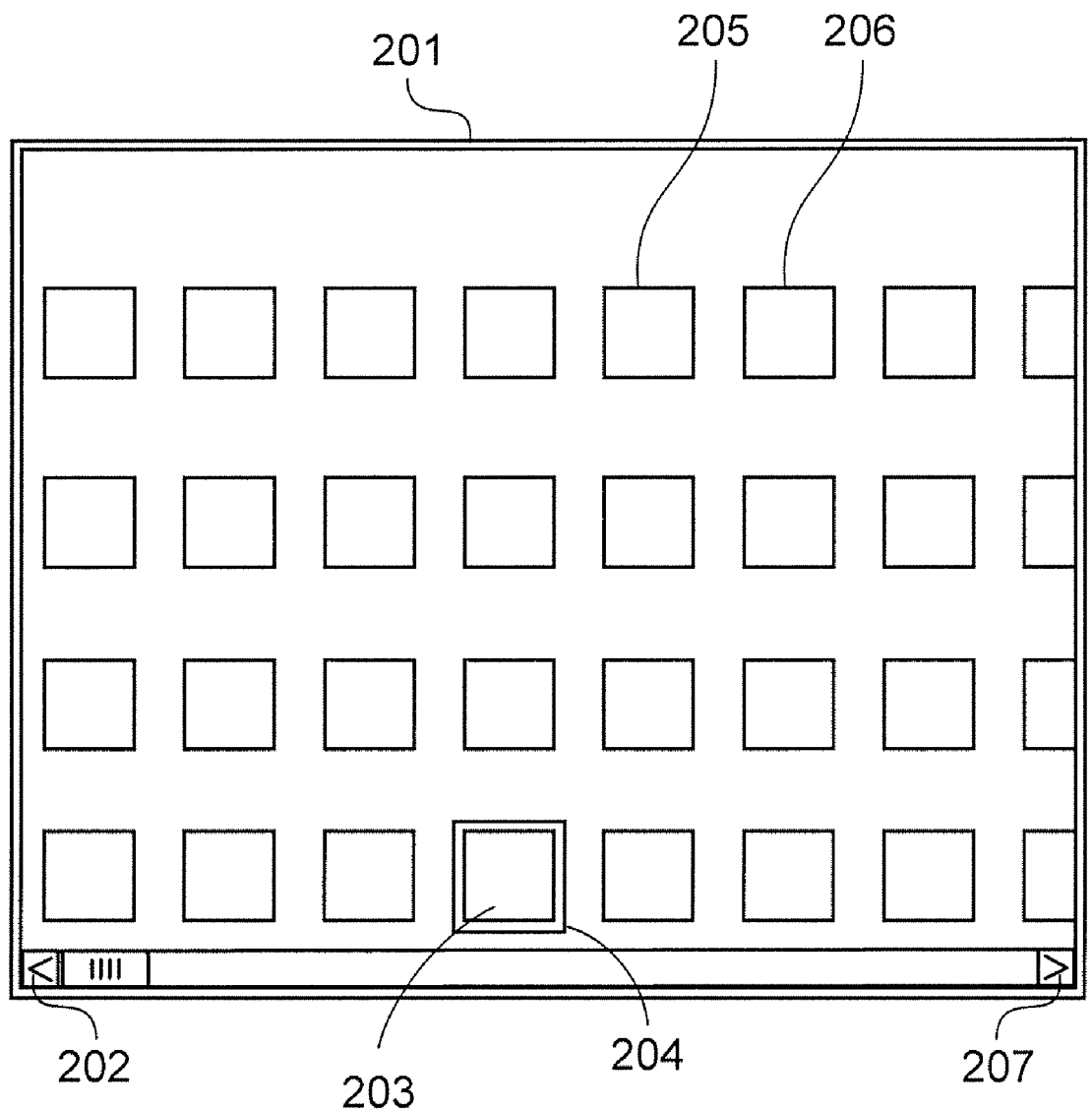
FIG. 2 shows a prior art system for displaying a scrolling set of items on a computer display.

Possibly the most natural way to disambiguate video from other content types is to play or reproduce the video item in the place where the preview is shown, such as in the browser. This type of reproduction typically occurs at a resolution lower than the normally intended playback resolution of the video item. FIG. 2 shows a viewing area 201 of a prior art browser application, for example as presented upon the display 100 of FIG. 1 or the display 414 of FIG. 4, in which multimedia items of different types are shown. For example, item 205 represents a static photograph and item 206 which represents a video item. Whilst FIG. 2 shows the viewing area sized for presenting about 4×7 representation of items, it will be appreciated the size of the viewing area 201 may be modified to show a any number of rows and columns of items.

Generally the items will be reproduced as a list derived from the collection, the list being sorted into some order such as item name or date of creation. Even when presented in multiple rows and columns, the list and consequential ordering are generally discernable. The items displayed can be moved or scrolled through the viewing area 201 in different ways, for example using the scroll buttons 202 and 207. The buttons 202 and 207 are in fact virtual buttons or user selectable icons that may be selected using a cursor (not illustrated) associated with the position or movement of a pointing device, such as the mouse 403. One item 203 can be selected at a time, by user operation of the remote control 105, the keyboard 402 or the mouse 403, and the selection may be indicated for example by highlighting using an outline 204. The selection can then instigate, if the item 203 is a video item, the replay of the video item 204 within the browser viewing window 201. In such an arrangement, it is thus possible for the user to select for replay some or all of the video items in the window 201 so that the content of each preview itself implicitly conveys the type of each particular item. Because the content of a video item has a temporal length, multiple ones of the selected video items may therefore be replaying in the window 201 simultaneously with each at its own stage of reproduction. There is a problem for the user in such a situation however, because when multiple video items play, it causes distraction of the user, from viewing a single item. For example in FIG. 2 if item 206 was showing video sequence it becomes more difficult to pay dedicated attention to the selected item 203.

To improve the satisfaction and effectiveness of visually browsing multimedia items, the present disclosure proposes to control video playback based on the scrolling action controlled by the user. According to the present disclosure, and with reference to FIGS. 5A and 5B, when the user scrolls a collection of data items, a subset 510 of which is represented within a browser window 501, the interface formed thereby is configured for multimedia items to automatically play their contents so that it is clear which items have video content. The items of the subset 510 are shown arranged regularly in rows and columns. Other arrangements may be used and typically the items are ordered in some way, for example base on name or date of creation (eg. capture date for images or video). When the user ceases the scrolling of items in the collection, those video items in view (ie. within the window 501) continue to play for a predetermined period of time and then stop playing, except for the or any selected item, which continues to play (if that selected item is a video item). This helps the user to scan the items for any desired video items but limits the distraction when the user ceases scrolling so that they can focus on the selected item without being distracted by video content playing in other areas of the screen. In some implementations, the playing of the video may not commence until such time as scrolling ceases, but then, after a predetermined period of time, the playback then adapts in response to the cessation of scrolling, by stopping, for example.

Figure 5A:
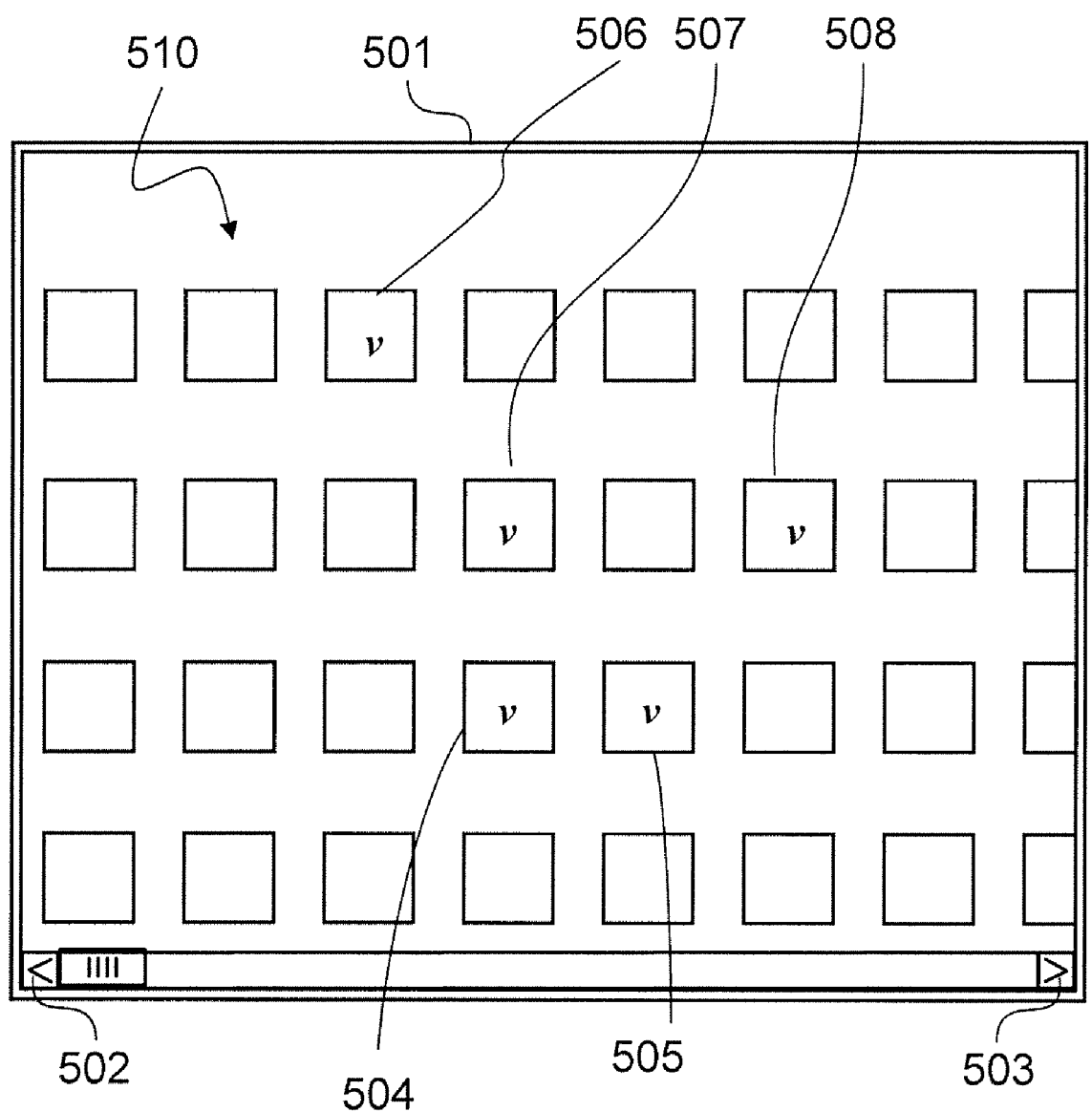
FIGS. 5A-5D shows implementation of browser windows according to the present disclosure.

Specifically, FIG. 5A shows the collection 510 of data items represented with the window 501 of a browser interface which has certain video items where "v" represents a static presentation and "v" represents a video item being reproduced (ie. played or replayed). When the present browser is initiated, typically all video items present within the viewing window 501 automatically commence playing. As seen in FIG. 5A, five video items 504-508 are seen each represented by a "v". Without any user intervention, after a predetermined period of time, which may be between say, 5 seconds and 30 seconds, each of the video items 504-508 will cease playing. Where an item has a duration of less than the predetermined period of time, once that item cease, it remains thereafter in a static representation, save for user interaction.

Figure 5B:
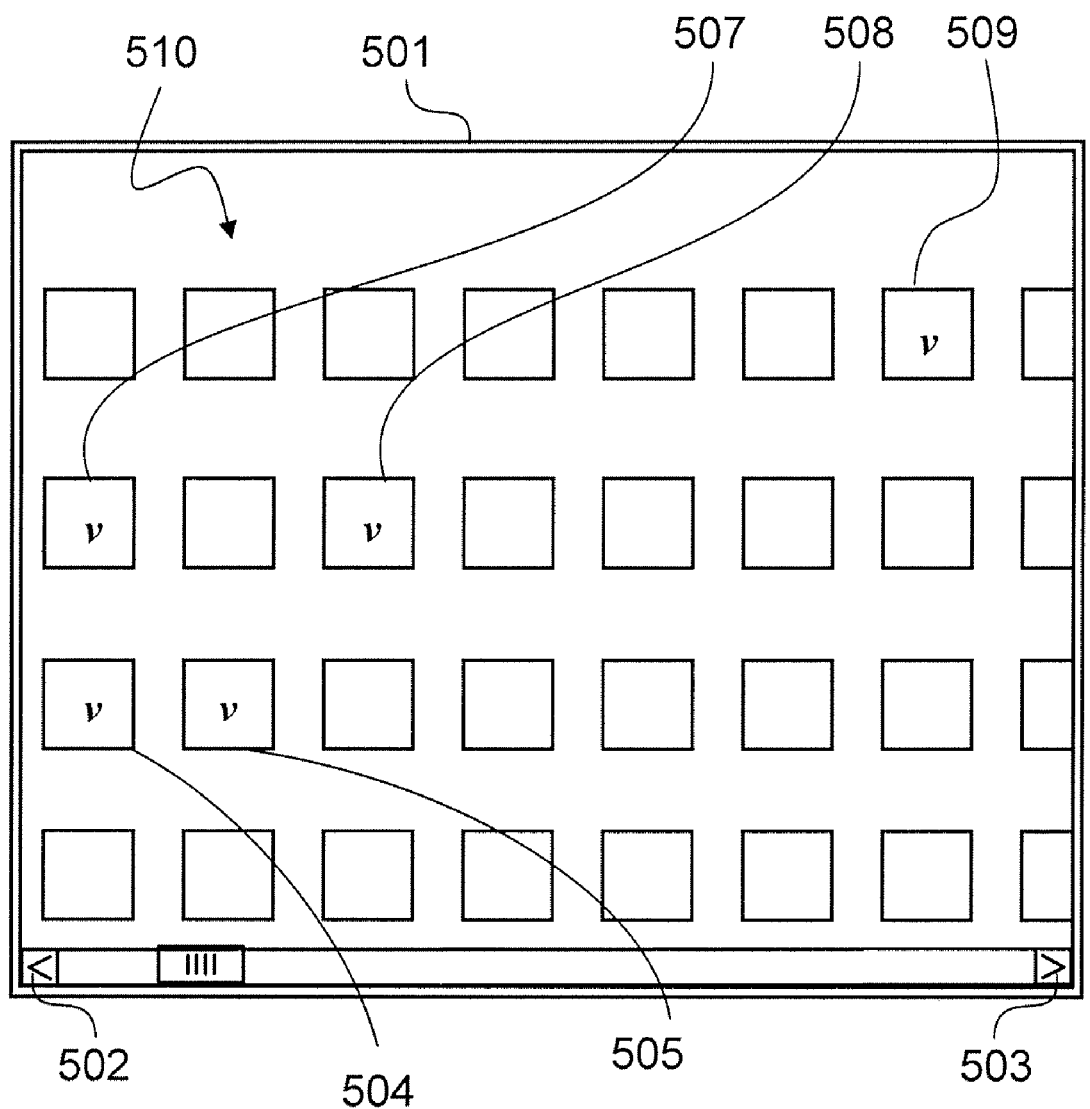

FIG. 5B shows the same collection 510 where the user has operated a scroll icon 503 to scroll to the right, thus causing the items represented in the window 501 to shift to the left. In this instance, playback of each represented video item occurs again, for a maximum of the predetermined period of time. It is observed that item 506 has scrolled out of the window 501 and a new video item 509 has scrolled into the window 501 and is played. In preferred implementations, playback is commenced when scrolling ceases and occurs thereafter for the predetermined period. Continuous scrolling desirably represents only static images.

Figure 5C:
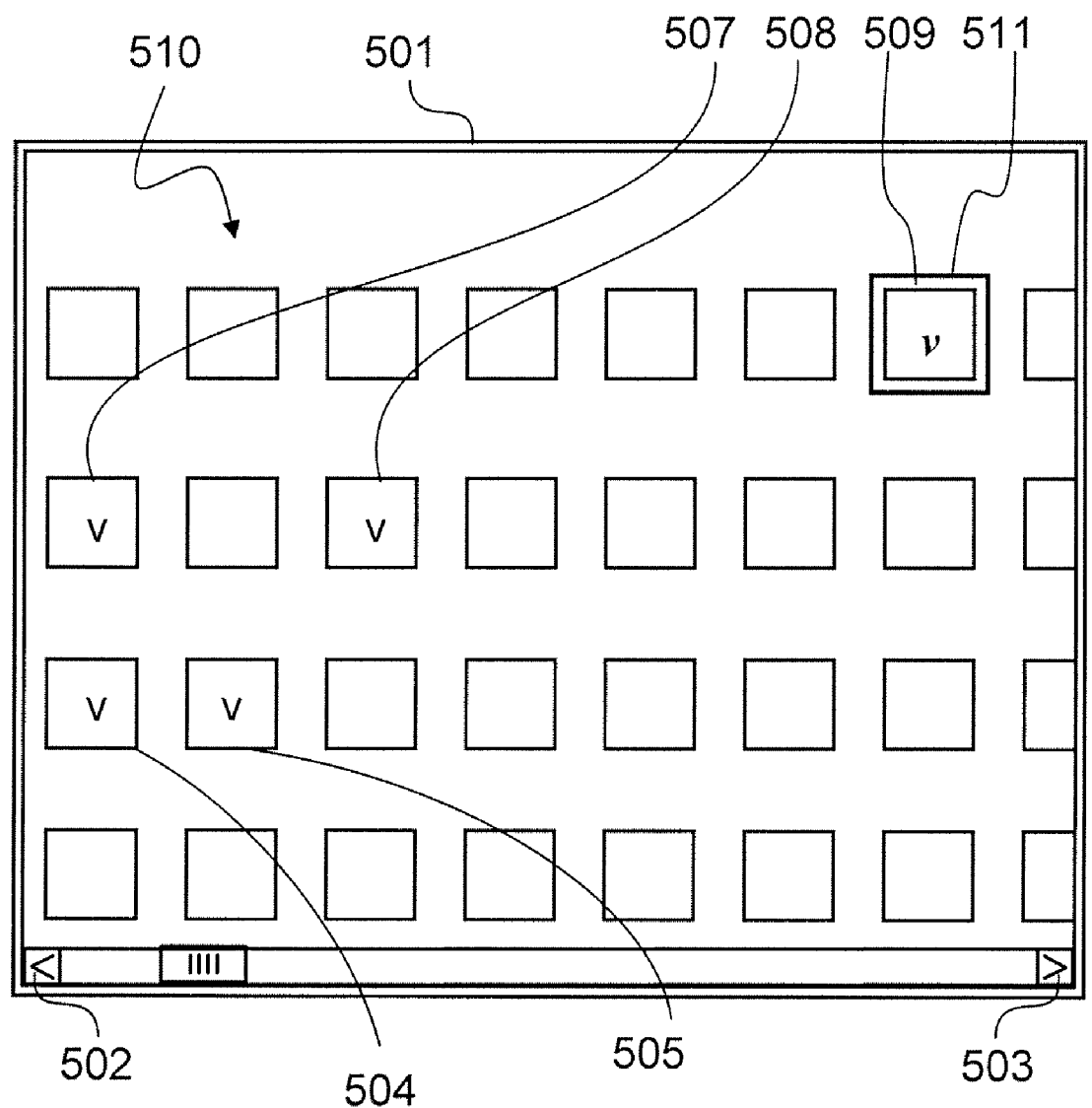

FIG. 5C shows a further instance of the presentation of FIG. 5B where the user has selected the video item 509, as indicated by a highlight box 511, and the item 509 continues to play, whereas the items 504, 505, 507 and 508 have each ceased playing by a maximum of the predetermined duration of time. The selection of the video item 509 may be by way of a mouse cursor selection, as known in the art.

In an alternate implementation, the video items which are not selected do not stop immediately when the predetermined time interval has passed, but instead slow down gradually. In another implementation, the video items which are not selected do not stop immediately when the predetermined time interval has passed, but instead those items adapt their playback by skipping some frames, thereby altering the playback speed of the item. In further alternatives, the video items do not stop completely but, their reproduction is adapted to reduce the distracting effect of items with changing visual content. Examples of such adaption include, reducing the brightness of reproduction to make the replay darker, increasing a transparency of the reproduction, and muting an accompanying audio track associated with the video sequence, to name but a few.

Figure 5D:
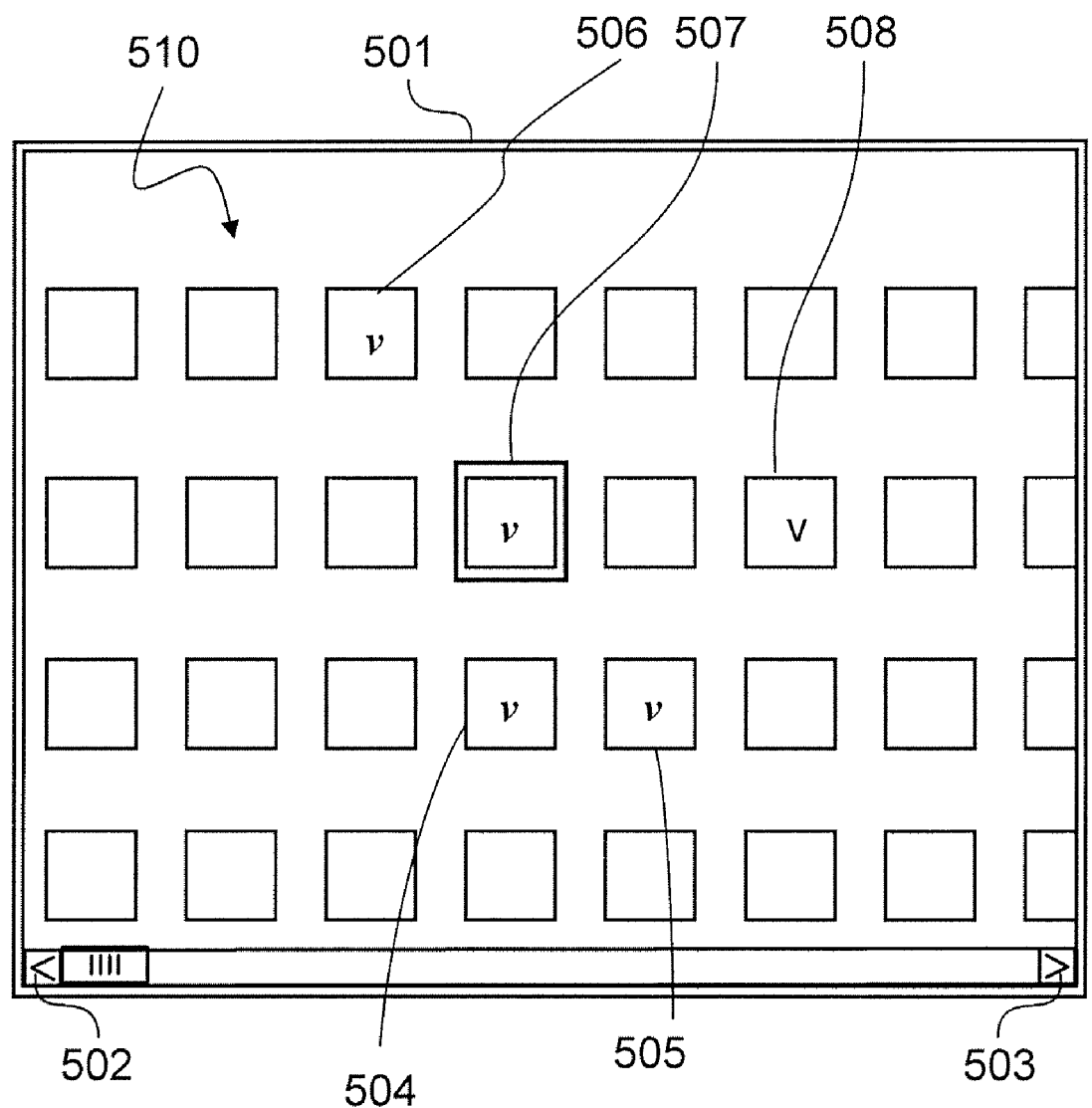

In another implementation, the playback of video items is linked to their proximity to the selected item, which may be considered a "focus" or reference item. In this implementation, video items near to the focus item play back for a longer period of time than items which are farther away. The interface may be further configured such that items beyond a certain proximity may not play at all. This reduces the amount of movement on the display screen more quickly and produces a smoother slowing down of movement on the display screen than when every item stops at the same time. This is seen for example in FIG. 5D, which represents the part of the collection shown in FIG. 5A but where video item 507 has been selected by the user and is thus considered by the browser to be a "focus" item. As seen the focus item 507 replays, as do items 504, 505 and 506 which are positioned in locations immediately adjacent the focus item 507. Item 508, which is two locations removed from the focus item 507 is shown having ceased playing, or not having played at all. In a further implementation, the focus item may be configured to replay for a first predetermined period, whilst other video items are configured to replay for one or more further period. The further periods may be progressively longer or shorter than the first period.

The focus item mentioned above is "selected" by user action. However, such need not be the case. For example, the focus item may be any item that occupies a predetermined reference position the display window 501 (such as the centre). As items are scrolled, different items occupy the reference position, thereby changing reference items.

In another implementation, the playback of video items is linked to an inverse of their proximity to the selected focus item. The browser is configured such that video items far away from the focus item play back for longer periods of time than items which are closer. This may be preferable for certain types of collection where video items are quickly discernable and items near the focus region of the screen are readily identified, while items further away from the natural focus area will take longer to be looked at and evaluated by the user. Such an arrangement is not illustrated but will be appreciated to complement the illustration of FIG. 5D for example.

Figure 6:
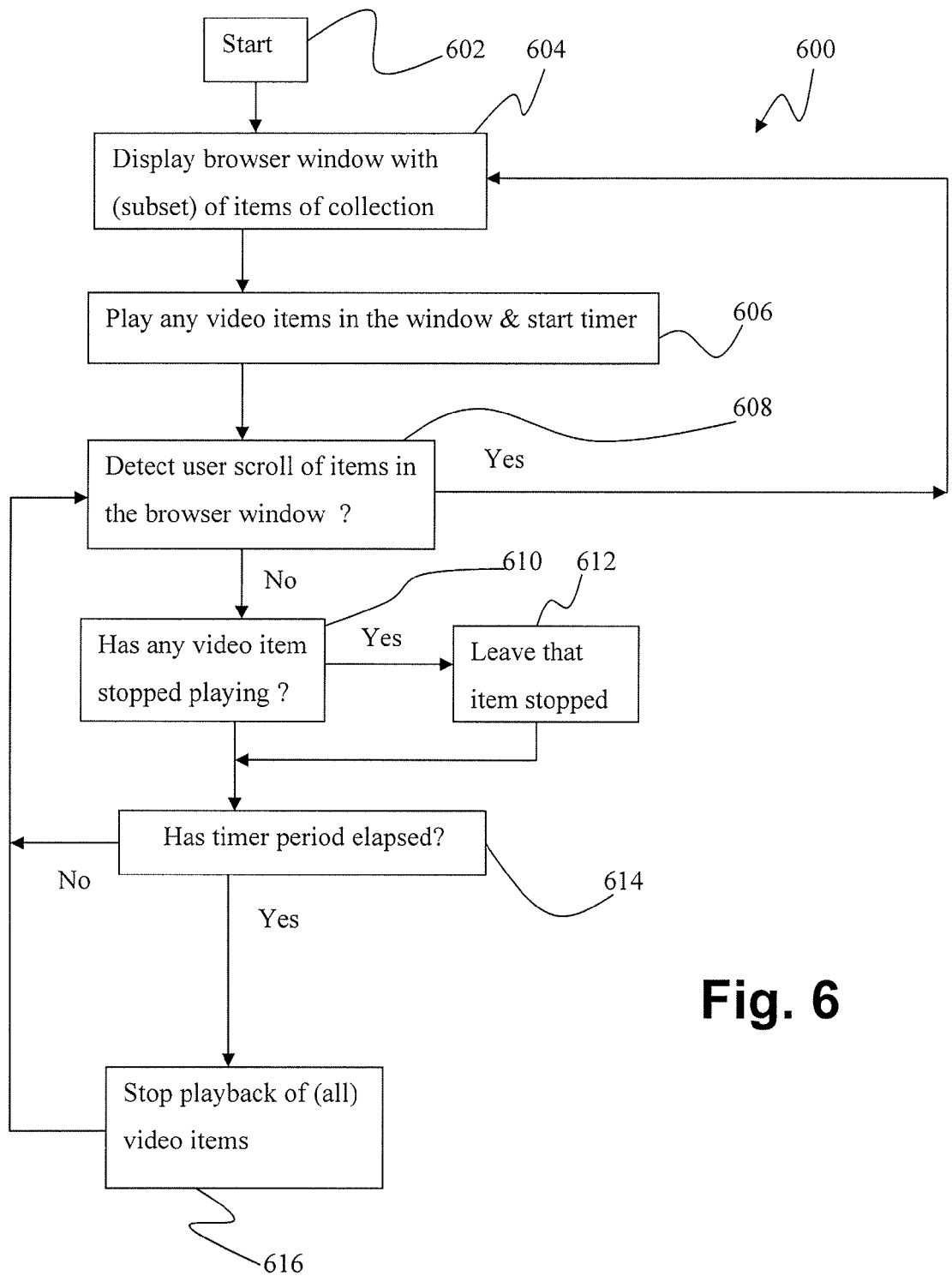
FIG. 6 is a flowchart representing a method of scrolling a collection of items having video items.

FIG. 6 an exemplary method 600 by which a browser may be operated according to the present disclosure. The method 600 is preferably implemented as software executable upon a computer device such as 101 or 401 and may be a subprogram of a more significant application or operating system. The method 600 commences with an entry start step 602 which may occur upon initiation of the browser. At step 604 which follow a browser window (eg. 501) is displayed upon a display device (eg. 100, 414) and is populated with representations of items of a collection of items. Those items represented represent a subset of the collection. The representations are typically thumbnail-style representation particularly where the content is image-based. Step 606, according to one specific implementation, then operates to play each item of video content in the collection as represented in the window 501. The video items are played in their respective presentations within the browser window, for example at thumbnail size or larger as may be specified by default or user selection. When the video items commence their playback a time is started which operates for a predetermined period of time. Step 608 then operates to detect a user action to scroll the collection as represented. If scrolling is detected (yes), control returns to step 604 and a revised or new subset of items from the collection is then displayed in the browser window.

If no scrolling action is detected, step 610 follows step 608 and monitors the playback of each video item. Where any such item has stopped (ie. it's duration is shorter than the predetermined period), then that item remains stopped. In alternate implementations, that item may be replayed in acyclic fashion. Step 614 then test the timer to check if the predetermined period has elapsed. If not, step 614 loops back to step 608 to check for any scrolling action of the user.

If the period has expired, step 616 then operates to stop playback of any still playing items, thereby ensuring all video items in the browser window have stopped, even though some may not have completed playback. The method 600 then loops back to step 608 to again await user scrolling action.

It follows from the method 600 that user scrolling causes the playback of video items shown in the browser window and that the cessation of scrolling commences a period after the expiration of which the playback ceases. As such, by responding to user input (ie. scrolling input) the reproduction of a displayed video item is adapted by cessation, after a predetermined period of time.

Playback of video items according to the present disclosure is therefore not based upon any universal principle applied at all times to all items, nor on any directed user input specifically to control the playback of one or more items. Instead the playback is adapted when the scrolling of a list of items is adapted. Moreover the cessation of playback is adapted to respond to the scrolling actions of the user, specifically the cessation of scrolling.

INDUSTRIAL APPLICABILITY

The arrangements described are applicable to the computer and data processing industries and particularly for the browsing of collections of data items including video items.

The foregoing describes only some embodiments of the present invention, and modifications and/or changes can be made thereto without departing from the scope and spirit of the invention, the embodiments being illustrative and not restrictive.

For example, the predetermined periods discussed wherein may be set by default, or by the user. Further such may be dynamic, for example corresponding to the shortest duration of any video item represented in the display window 501. Such a period may also be thresholded to a predetermined maximum (say 30 seconds), thereby ensuring that all video playback is terminated within 30 seconds of cessation of scrolling.

I claim:

1. A computer-implemented method of displaying a plurality of items including video items on a display device, the method comprising steps of:
    displaying a plurality of items in a predetermined arrangement on a display device;
    receiving a scrolling instruction to modify the displayed plurality of items;
    playing at least one video item displayed in the predetermined arrangement upon termination of the scrolling instruction, while maintaining the predetermined arrangement of the plurality of items on the display device, wherein the playing step is performed after a predetermined period of time, the predetermined period of time being determined by a position of the at least one video item being played relative to a reference item of the plurality of items and a display position of the at least one video item;
    receiving a user instruction to select one of the video items; and
    in response to the selection, stopping the playing of the at least one video item except the selected video item after a predetermined period of time.

2. A method according to claim 1, wherein the termination of the scrolling instruction is by a user input.

3. A method according to claim 1, wherein the displayed video items include a selected focus item, a playback of which is adapted differently from remaining displayed video items.

4. A non-transitory computer-readable storage medium including instructions for rendering a user interface, the user interface comprising:
    a viewing window displayable upon a display device in which a plurality of items of a collection are displayed in a predetermined arrangement, at least one of the plurality of items being a video item;
    an input to receive a scrolling instruction from a user to modify the displayed plurality of items;
    an adapting function responsive to termination of the scrolling instruction to play at least one video item displayed in the predetermined arrangement after a predetermined period of time, while maintaining the predetermined arrangement of the plurality of items on the display device, wherein the predetermined period of time being determined by a position of the at least one video item being played relative to a reference item of the plurality of items and a display position of the at least one video item;
    an input to receive a selecting instruction from the user to select one of the video items displayed in the predetermined arrangement; and
    a stopping function adapted to stop the playing of the at least one video item displayed in the predetermined arrangement except the selected video item after a predetermined period of time.

5. A non-transitory computer-readable storage medium according to claim 4, wherein the playing of the at least one displayed video item comprises any one or more of:
    adapting differently the playing of one displayed video item from remaining displayed video items;
    adapting a playback speed of the at least one displayed video item; and
    showing a reduced subset of frames of the at least one displayed video item.

6. A non-transitory computer-readable storage medium having a computer program recorded thereon, the program being executable by a computer to perform a method for displaying a plurality of items including video items on a display device, wherein the method includes steps of:
    scrolling a displayed plurality of items to modify a displayed subset of the plurality of items in response to a scrolling instruction;
    playing at least one video item displayed in a predetermined arrangement upon termination of the scrolling instruction, while maintaining the predetermined arrangement of the plurality of items on the display device, wherein the playing step is performed after a predetermined period of time, the predetermined period of time being determined by a position of the at least one video item being played relative to a reference item of the plurality of items and a display position of the at least one video item; and
    ceasing the playing of the at least one video item except the selected video item after a predetermined period of time in response to a selecting instruction associated with one of the video items.

7. A computer apparatus for browsing a plurality of items including video items on a display device, the apparatus comprising a processor programmed to:
    display a plurality of the items in a predetermined arrangement on a display device;
    receive a scrolling instruction to modify a displayed subset of the plurality of items;
    play at least one video item displayed in the predetermined arrangement after a predetermined period of time upon termination of the scrolling instruction, while maintaining the predetermined arrangement of the plurality of items on the display device, wherein the predetermined period of time being determined by a position of the at least one video item being played relative to a reference item of the plurality of items and a display position of the at least one video item;
    receive a user instruction to select one video item; and
    in response to the selection of the one video item, stop the playing of the at least one video item except the selected video item after a predetermined period of time.

* * * * *